US008010849B2

(12) United States Patent
Butcher et al.

(10) Patent No.: US 8,010,849 B2
(45) Date of Patent: Aug. 30, 2011

(54) DIAGNOSING FAULTS WITHIN PROGRAMS BEING EXECUTED BY VIRTUAL MACHINES

(75) Inventors: David J. Butcher, King's Lynn (GB); Jeremy I. Johnson, Cambridge (GB); Sidath A. Senanayake, Cambridge (GB)

(73) Assignee: ARM Limited, Cambridge (GB)

( * ) Notice: Subject to any disclaimer, the term of this patent is extended or adjusted under 35 U.S.C. 154(b) by 827 days.

(21) Appl. No.: 11/516,666

(22) Filed: Sep. 7, 2006

(65) Prior Publication Data

US 2008/0126872 A1    May 29, 2008

Related U.S. Application Data

(60) Provisional application No. 60/842,161, filed on Sep. 5, 2006.

(51) Int. Cl.
*G06F 11/00* (2006.01)
(52) U.S. Cl. ........................................................ 714/46
(58) Field of Classification Search ............ 714/27, 714/37, 38.1, 46
See application file for complete search history.

(56) References Cited

U.S. PATENT DOCUMENTS

| 5,745,703 | A  | * | 4/1998  | Cejtin et al. .................. 709/238 |
| 6,966,063 | B1 | * | 11/2005 | Meric et al. ................... 719/321 |
| 7,617,487 | B2 | * | 11/2009 | Kilian et al. .................. 717/127 |
| 2002/0066003 | A1 | * | 5/2002 | Nevill et al. .................. 712/209 |
| 2002/0073063 | A1 | * | 6/2002 | Faraj ............................... 707/1 |
| 2003/0154239 | A1 | * | 8/2003 | Davis et al. ................... 709/201 |
| 2003/0167421 | A1 | * | 9/2003 | Klemm ........................... 714/37 |
| 2003/0177476 | A1 | * | 9/2003 | Sarma et al. .................. 717/128 |
| 2003/0188163 | A1 | * | 10/2003 | Fischer et al. ................ 713/170 |
| 2004/0064552 | A1 | * | 4/2004 | Chong et al. .................. 709/224 |
| 2004/0123271 | A1 | * | 6/2004 | Bindewald et al. ........... 717/124 |
| 2006/0059146 | A1 | * | 3/2006 | McAllister et al. .............. 707/6 |
| 2007/0294512 | A1 | * | 12/2007 | Crutchfield et al. .......... 712/200 |
| 2009/0083715 | A1 | * | 3/2009 | DeWitt et al. ................. 717/128 |

OTHER PUBLICATIONS

"Designing Applications with JBuilder®", JBuilder 2005®, Borland® Excellence Endures™ (white paper/application note).*
Sun Microsystems, "KVM Debug Wire Protocol Specification Version 1", copyright Dec. 2002.*

* cited by examiner

*Primary Examiner* — Scott T Baderman
*Assistant Examiner* — Yair Leibovich
(74) *Attorney, Agent, or Firm* — Nixon & Vanderhye P.C.

(57) ABSTRACT

A debug interface is disclosed that is operable to receive diagnostic signals from a host debugger, amend the diagnostic signals and send the amended diagnostic signals to a virtual machine operable to process a plurality of applications in parallel. The debug interface comprises: at least one port corresponding to at least one of said plurality of applications; and diagnostic signal processing logic; wherein said at least one port is operable to receive a diagnostic signal from said host debugger, said diagnostic signal specifying a diagnostic operation to be performed on an application running on said virtual machine; and said diagnostic signal processing logic is operable to determine which of said plurality of applications said received diagnostic signal pertains to in dependence upon said at least one port said diagnostic signal was received at, and to amend said received diagnostic signal to identify said application prior to sending said amended diagnostic signal to said virtual machine.

20 Claims, 4 Drawing Sheets

DIAGNOSING FAULTS WITHIN PROGRAMS BEING EXECUTED BY VIRTUAL MACHINES

This application claims benefit of U.S. Provisional Application No. 60/842,161, filed Sep. 5, 2006, entitled "Diagnosing Faults with Programs Being Executed by Virtual Machines". The entire contents of this application is incorporated herein by reference.

BACKGROUND OF THE INVENTION

1. Field of the Invention

The field of the invention relates to data processing and in particular to fault diagnosis on virtual machines.

2. Description of the Prior Art

It is known to provide debugging facilities for virtual machines. For example, a standard KDWP protocol has been developed to debug java applications on a virtual machine. The KDWP protocol has been adapted from the JDWP protocol to provide diagnostic operations on virtual machines with low memory resources. The KDWP protocol provides a subset of the JDWP functions and is adapted to process operations with high memory constraints on the host rather than on the machine being diagnosed.

FIG. 1 schematically shows a java debugger according to the prior art. Java debugger 10 is typically located on a host computer such as a PC and sends known java debug chains to the java enabled device 20, which in this case comprises a debug proxy 22 and a java virtual machine 24. The java proxy 22 receives the java debug chains in the JDWP protocol and converts them to KDWP protocol and then sends the appropriate diagnostic signals to the java virtual machine 24 which may comprise breakpoints, stop/starting diagnostic signals for the virtual machine or data to be processed by the machine. Diagnostic data is then captured by the debug proxy 22 and sent back to host debugger 10.

Java virtual machines are now able to run multiple applications in parallel. Such machines are not able to be debugged using known techniques such as that illustrated in FIG. 1 as the debug proxy 22 cannot tell which application a particular thread on the virtual machine belongs to.

It would be desirable to be able to debug virtual machines running multiple applications using pre-existing Java debug chains that have already been developed and whose properties are known. The ability to use pre-existing java debug tools would enable programmers to use tools they already know and also allow them to choose a tool with appropriate features from the wide range of already developed tools.

SUMMARY OF THE INVENTION

A first aspect of the present invention provides a debug interface operable to receive diagnostic signals from a host debugger, amend said diagnostic signals and send said amended diagnostic signals to a virtual machine operable to process a plurality of applications in parallel, said debug interface comprising: at least one port corresponding to at least one of said plurality of applications; and diagnostic signal processing logic; wherein said at least one port is operable to receive a diagnostic signal from said host debugger, said diagnostic signal specifying a diagnostic operation to be performed on an application running on said virtual machine; and said diagnostic signal processing logic is operable to determine which of said plurality of applications said received diagnostic signal pertains to in dependence upon said at least one port said diagnostic signal was received at, and to amend said received diagnostic signal to identify said application prior to sending said amended diagnostic signal to said virtual machine, such that said virtual machine is operable to perform said diagnostic operation on said identified application in response to said received diagnostic signal.

The present invention addresses the problem of existing debuggers not being suitable for use on virtual machines running multiple applications by providing an interface between a host debugger and a virtual machine running multiple applications. The interface provides a plurality of ports for the host debugger to connect to each port being specific to a particular application. Thus, the host debugger connecting to a particular port thinks it is connecting to a virtual machine that is exclusively running the application corresponding to that port and thus, the host debugger can safely ignore the fact that there are multiple applications running and can operate in the same way as host debuggers of the prior art. Thus, the present invention provides a simple way to extend protocols such as existing protocols like the KDWP protocol to support multiple applications running on a single virtual machine without extending the protocol itself. In effect, the invention allows the interface to automatically create a "pseudo proxy" at a port, with the port corresponding to one application within the virtual machine. Thus, the interface acts to filter events passed through that port according to the application the port corresponds to. The host debugger connected to the port therefore sees only a single application running on a virtual machine and can operate in the same way as it would when debugging a virtual machine running a single application.

It should be noted that the debug interface could comprise two portions the first portion having the multiple virtual ports and the second portion being the filtering portion and having the diagnostic signal processing logic. The diagnostic signal processing logic is operable when sending a debugging signal to an application to identify that application in dependence on the virtual port it received the signal from and when returning the signals resulting from the diagnostic operation performed to remove any application identifying information and to send the resulting signal to the appropriate port.

In some embodiments, the debug interface comprises a plurality of ports.

As a plurality of applications are running on the virtual machine, if the debugger wishes to debug more than one of them then it is advantageous to provide several ports corresponding to several of the applications. Providing separate ports for different applications has the further advantage of providing a limited security barrier between the applications wherein the debugging of one application does not expose the internal operations of any other applications as the diagnostic signals received via a particular port are directed towards the application corresponding to that port on the virtual machine and the other applications are shielded from these diagnostic operations.

Although, in some embodiments there are fewer ports than there are applications running on the virtual machine in other embodiments the plurality of ports correspond to the plurality of applications.

It may be advantageous to only allow debugging of a subset of the applications, for example when one of the applications is a management application that the manufacturer of the device does not want to a user to have access to. However, in other embodiments it may be advantageous to be able to debug all of the applications.

Although the ports can be provided in a number of ways, in some embodiments said at least one port comprises an http port. This is a convenient way of providing one or more ports.

Although the virtual machine may take a number of forms, in some embodiments said virtual machine comprises a java virtual machine and said diagnostic signal processing logic is operable to receive diagnostic signals in a JDWP format and to amend said diagnostic signals to a KDWP protocol.

The KDWP format has been developed to debug virtual machines on java enabled devices having limited memory capacity such as mobile phones. It can be advantageous to be able to use this known protocol.

In some embodiments, said debug interface further comprises communication logic, said communication logic being operable prior to said debug interface receiving diagnostic signals from said debugger host to request and receive information from said virtual machine indicative of said plurality of applications being processed by said virtual machine, said debug interface being operable to generate said at least one port corresponding to at least one of said plurality of applications.

The debug interface is able to generate the at least one port by requesting information from the virtual machine concerning the plurality of applications being processed by the virtual machine. It can then generate at least one port corresponding to one of these applications thereby allowing a host to debug this application by connecting to this port.

Although the debug interface may only generate a single port if only one application is to be debugged, in other embodiments it generates a plurality of ports such that a plurality of the applications can be debugged.

In some embodiments, said debug interface is operable to store data identifying said application corresponding to said at least one port, and is operable to provide said identifying data to said debugger host in response to a request for said information.

When requesting information concerning the applications running on the virtual machine, the debug interface may also receive and store data identifying each application corresponding to the ports. It can then provide this identifying data to the debugger host which can be useful in allowing a user to select a port to send the debugger diagnostic signals to in dependence upon an application that they wish to debug.

In some embodiments, said communication logic is operable to receive diagnostic data from said virtual machine generated by diagnostic operations performed on an application in response to said amended diagnostic signals and to output said diagnostic data from said port corresponding to said application said diagnostic operation was performed on.

The debug interface amends the diagnostic signals to make them identifiable by the virtual machine as pertaining to a particular application and then receives the diagnostic data generated in response to these diagnostic signals. The generated diagnostic data is output at the port corresponding to the application so that the debugger host continues to communicate with the port of the interface as though it were a single virtual machine processing the application.

A second aspect of the present invention comprises a virtual machine operable to process a plurality of applications in parallel and operable to receive a debug diagnostic signal, said debug diagnostic signal identifying one of said plurality of applications, said virtual machine being operable in response to said debug diagnostic signal to perform a diagnostic operation on said identified application in response to said received debug diagnostic signal.

A virtual machine that is operable to process a plurality of applications in parallel can allow debugging of these applications provided that the debug diagnostic signals that it receives contain information identifying the application that they pertain to. If such information is present in the diagnostic signals, the virtual machine is operable in response to the signal to perform the diagnostic operations on the identified application.

The virtual machine may be located on a number of devices including a mobile telephone or a set top box.

A third aspect of the present invention provides a system comprising a debug interface according to a first aspect of the present invention in data communication with a virtual machine according to a further aspect of the present invention.

A fourth aspect of the present invention provides a method of amending diagnostic signals received from a host debugger to make them suitable for performing diagnostic operations on an application running on a virtual machine processing a plurality of applications in parallel, said method comprising the steps of: receiving at said at least one port a diagnostic signal from said host debugger, said diagnostic signal specifying a diagnostic operation to be performed on an application running on said virtual machine; determining which of said plurality of applications said received diagnostic signal pertains to in dependence upon said at least one port said diagnostic signal was received at; and amending said received diagnostic signal to identify said application prior to sending said amended diagnostic signal to said virtual machine, such that said virtual machine is operable to perform said diagnostic operation on said identified application in response to said received diagnostic signal.

A fifth aspect of the present invention provides a computer program product which is operable when run on a data processor to control the data processor to perform the steps of the method according to a fourth aspect of the present invention.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 2:
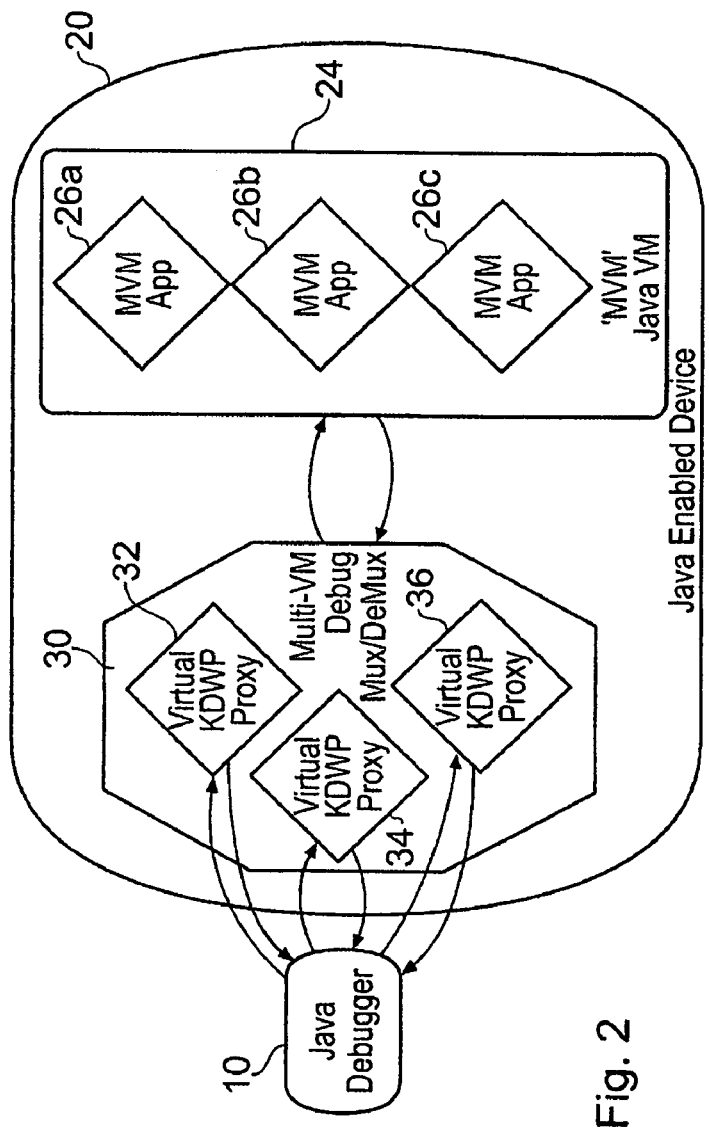
FIG. 2 schematically shows a debug system according to an embodiment of the present invention.

FIG. 2 shows a java debugger host device and a java enabled device 20 which comprises a debug interface 30 and a java multiple virtual machine.

Host device 10 is operable to run a debug program which generates java debug chains which are sent to the java virtual machine 24 via debug interface 30. Java virtual machine 24 is a multiple virtual machine operable to run multiple applications 26a, 26b, 26c and thus, in order to enable it to be debugged using conventional debug protocols a debug interface 30 is used.

Figure 1:
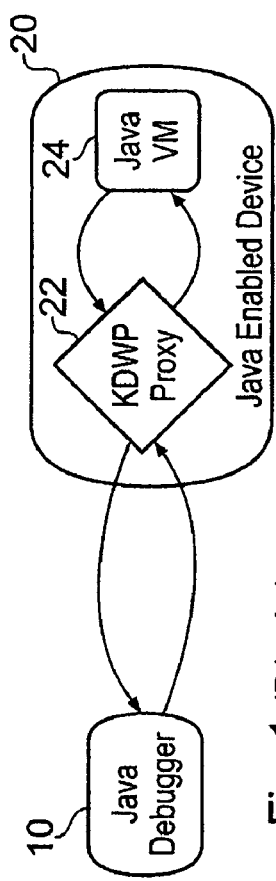
FIG. 1 schematically shows a debug system according to the prior art.

Debug interface 30 comprises a plurality of virtual KDWP proxies similar to the KDWP proxy of the prior art device of FIG. 1. These pseudo or virtual proxies are created by debug interface 30 for each application running on the java virtual machine 24. Each pseudo proxy has an http port via which the host java debugger 10 communicates with the debug interface. Thus, host device 10 sees a plurality of ports each corresponding to one of the multiple applications running on the java virtual machine. The host machine 10 can communicate with each port as though it was communicating with a single independent virtual machine running a single application. Conventional host devices can debug multiple virtual machines at one time and thus, they can debug multiple applications running on a single machine using the debug interface 30 which in effect mimics plural virtual machines each running a single application.

Each virtual proxy 32, 34, 36 comprises logic operable to receive at its http port the diagnostic signals from the java debugger on the host machine and to amend these signals. Each of the proxies corresponds to a particular application and information regarding that particular application is sent to the java virtual machine 24 via the proxy such that diagnostic operations specified by the diagnostic signals can be performed upon the correct application. Each application running in the java virtual machine 24 has identification data and this information is at initiation of the debug procedure requested by the debug interface 30 from the java virtual machine 24 prior to debug operations commencing. In response to receiving information regarding the applications 26a, 26b, 26c running on java virtual machine 24 and their identification data the debug interface 30 generates virtual KDWP proxies for at least some of these applications. Each proxy has its own port and information regarding the application identification data corresponding to that particular proxy. Thus, diagnostic signals received at the port of a proxy have the corresponding application identification data added to them prior to them being sent to Java virtual machine 24. This enables java virtual machine 24 to identify the application that the diagnostic operation is to be performed upon and to perform the operation on the corresponding thread. When returning signals indicating the results of diagnostic operations performed, the signals received have application identification data attached to them. This enables them to be passed to the appropriate virtual proxy which removes this identifying data prior to sending the signal from the corresponding virtual port to the java debugger 10.

Figure 3A:
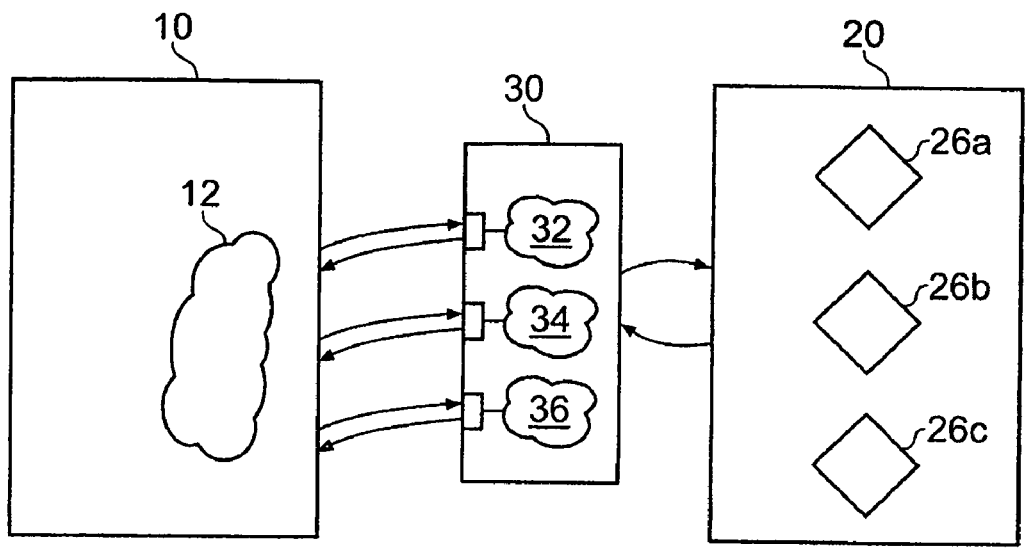
FIG. 3a shows a debug system with a separate debug interface according to an embodiment of the present invention.

FIG. 3a shows a further embodiment of the present invention in which java debug logic 12 within host machine 10, which may be a conventional PC, communicates via debug interface 30, having virtual proxies 32, 34 and 36 with Java virtual machine 20. In this embodiment the debug interface 30 is a separate device.

Figure 3B:
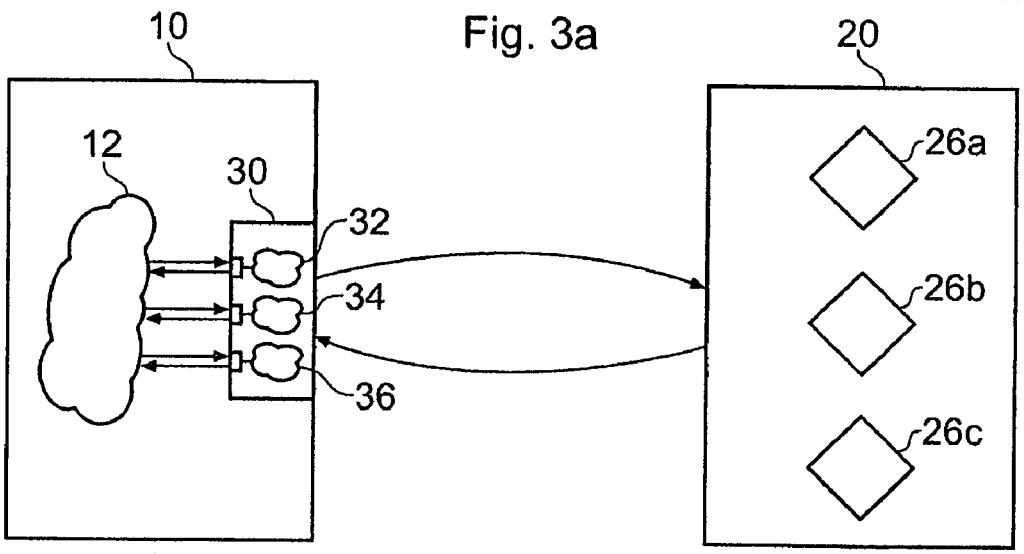
FIG. 3b shows a debug system where the debug interface is on the host debugger.
Figure 3C:
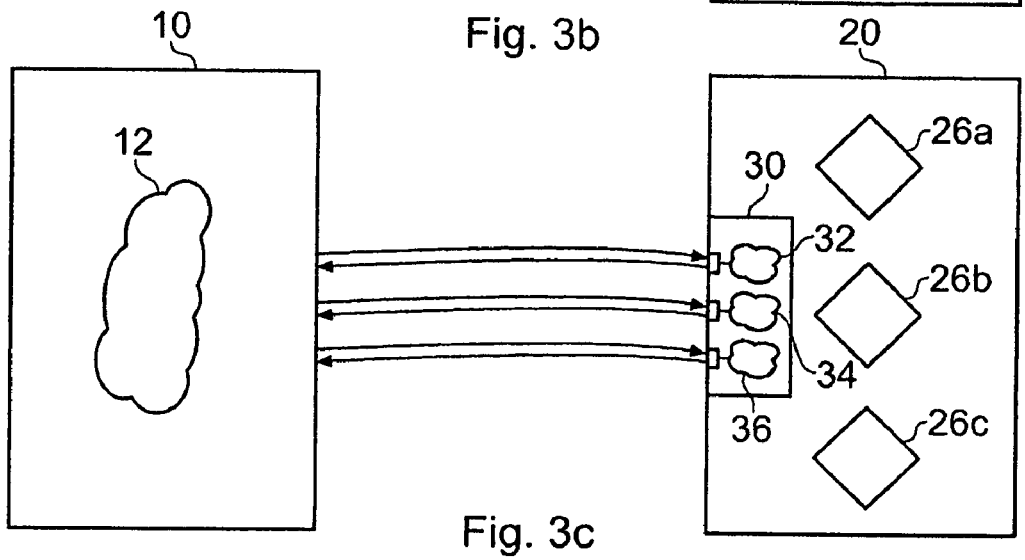
FIG. 3c shows a debug system where the debug interface is on the device being debugged.

FIG. 3b shows an alternative embodiment where debug interface 30 is comprised within the host machine 10. FIG. 3c shows a yet further embodiment where java virtual machine 20 in this case a mobile telephone comprises the debug interface 30 within itself. As can be seen from FIG. 3 the debug interface may be a separate add on device which can be connected to a conventional debugger to enable it to debug a multiple virtual machine (as is shown in FIG. 3a), or it may be part of the host, thereby enabling the host to debug multiple machines or it may be on the device with the java virtual machine as an extra application on the machine that allows debugging of the multiple machine by a conventional debugger.

It should be noted that alternative embodiments wherein the debug interface is comprised of two portions, one portion having the virtual ports and the other filtering portion having the logic operable to add application identifiers to signals received at respective virtual ports such that they are sent to the appropriate application are also possible. These two portions can be two individual devices, alternatively one or both of them may be comprised within either the host machine 10 or the java virtual machine 20.

Figure 4:
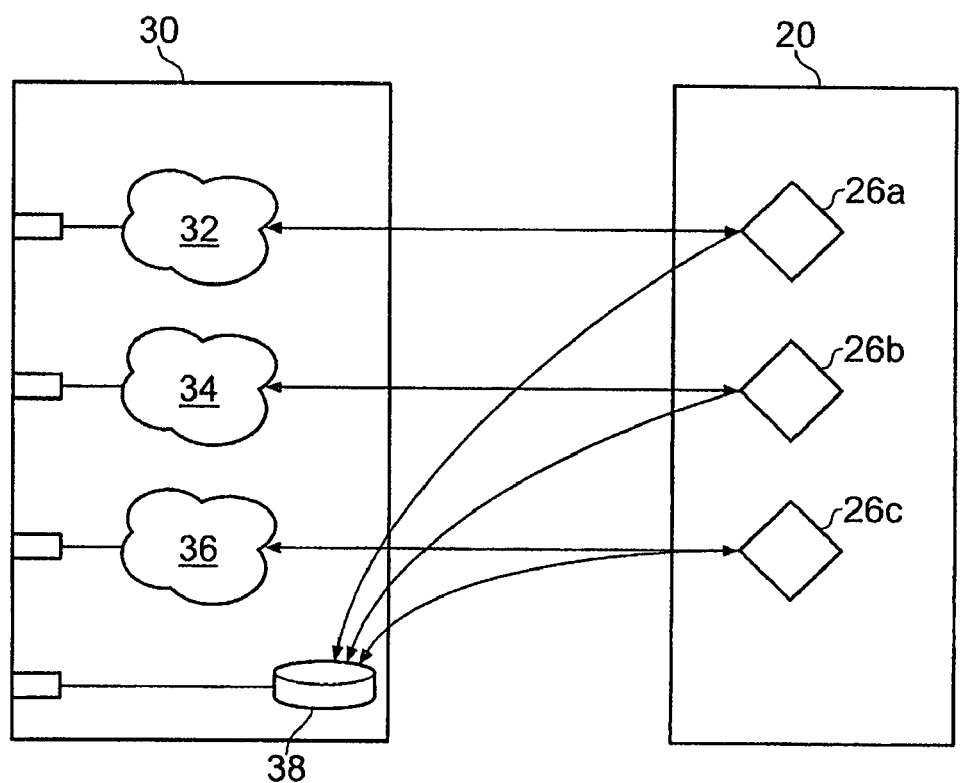
FIG. 4 shows a debug system according to an embodiment of the present invention.

FIG. 4 shows an embodiment of the present device in which debug interface 30 comprises a plurality of proxy interfaces 32, 34, 36 each operable to communicate with a separate application 26a, 26b, 26c. At the outset, debug interface 30 communicates with Java virtual machine 20 to request information on what applications it is processing. In response to this information, it generates the proxies 32, 34, 36 each having its own http port via which it communicates with the host, and also stores in storage space 38 information regarding which http port corresponds to which application.

This information can be accessed by java debugger host 10 (not shown) and can be displayed to a user. This enables a user wishing to debug a particular application to know immediately which port to connect to access that application. Without this information the host would have to cycle through the ports until it found the correct one.

It should be noted, that in the embodiment shown there are proxies for each application running, however, this need not be the case. For example, it may be that there is a management application that a manufacturer of the device does not wish to allow a user access to and thus, the virtual machine will not provide this information to the debug interface and as such no proxy will be generated in relation to this application.

It should also be noted, that debugging of applications is a potential security risk in general as it allows access to information that is usually hidden within a machine. Some degree of security is provided by the present system in that each application is analysed in isolation from another application by generation of these individual ports and virtual proxies. Thus, the possibility of leakage of data between applications during debug is avoided or at least reduced.

It should be noted that in the embodiments shown, the virtual machine has been a java virtual machine. However, a skilled person would understand that the present technique is also applicable to other virtual machines.

Figure 5:
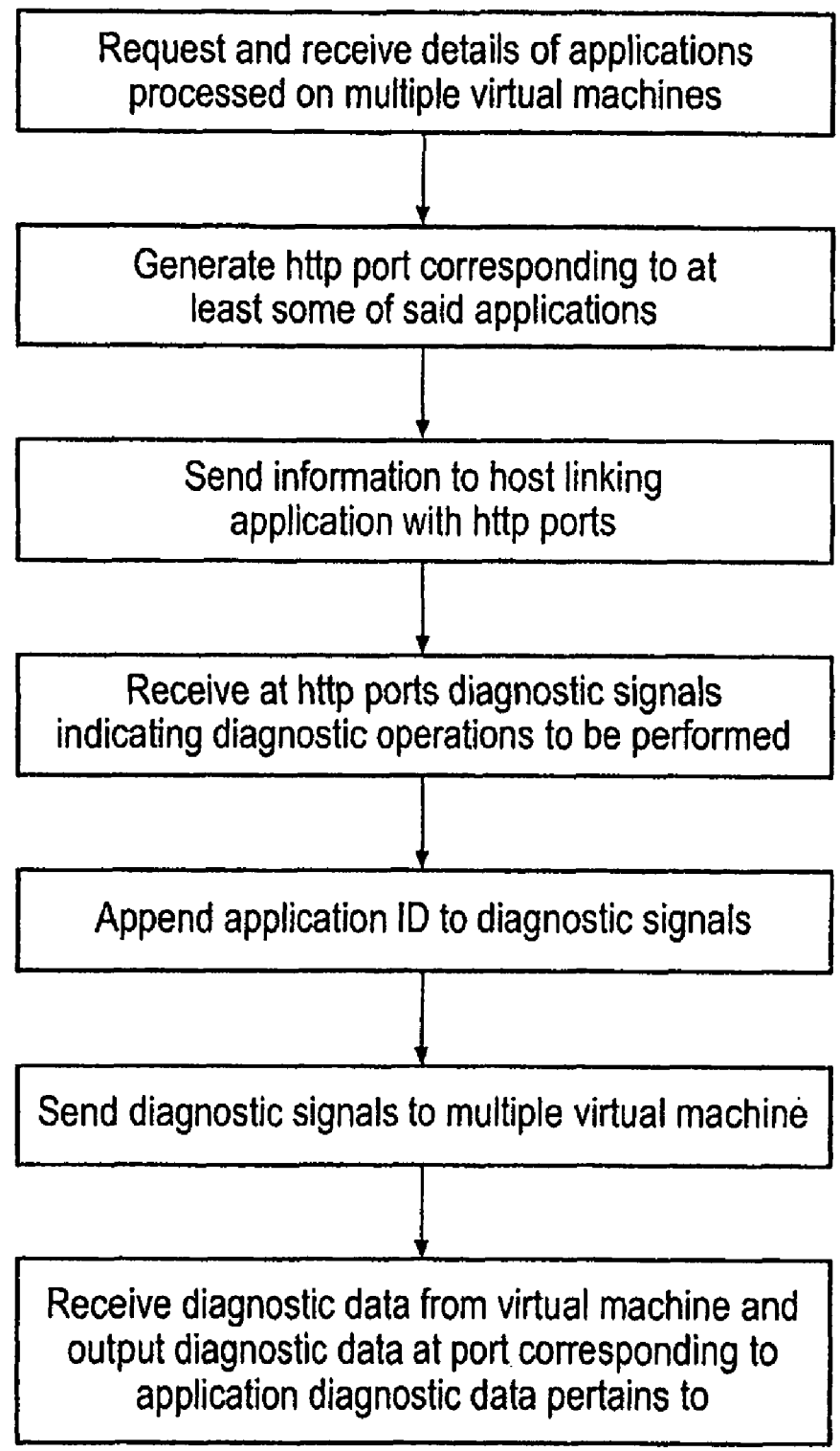
FIG. 5 is a flow diagram schematically showing a method according to an embodiment of the present invention.

FIG. 5 shows a flow diagram indicating steps in a method performed according to an embodiment of the present invention. In a first step details of applications being processed on the multiple virtual machine are requested and received by a debug interface. Debug interface then generates http ports corresponding to at least some of the applications. Information regarding the generated http ports and the applications they are associated with is then sent to a host debugger such that the host debugger can link the applications with the http ports. The debug interface then receives at its http ports diagnostic signals indicating diagnostic operations to be performed on the application associated with that port. It then acts to append the application ID associated with the port to the diagnostic signals received there, such that when these signals are sent from the debug interface to the multiple virtual machine the multiple virtual machine knows which application to perform the diagnostic operations on. The debug interface then receives diagnostic data from the virtual machine in response to the diagnostic operations that are performed. This diagnostic data comprises the application identifier information indicating which application this data relates to. The debug interface removes this information and outputs this data at the port corresponding to the application that the diagnostic data pertains to. It should be noted that although the debug interface can be implemented in a number of ways, in many embodiments it is implemented in software.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A debug interface for receiving diagnostic signals from a host debugger, amending said diagnostic signals and sending said amended diagnostic signals to a virtual machine, said virtual machine configured to process a plurality of applications in parallel, said debug interface comprising:
    at least one port corresponding to at least one of said plurality of applications; and
    diagnostic signal processing logic circuitry; wherein said at least one port receives a diagnostic signal from said host debugger, said diagnostic signal specifying a diagnostic operation to be performed on an application running on said virtual machine; and
    said diagnostic signal processing logic circuitry is configured to determine which of said plurality of applications said received diagnostic signal pertains to in dependence upon said at least one port from which said diagnostic signal was received, and to amend said received diagnostic signal to identify said application prior to sending said amended diagnostic signal to said virtual machine.

2. A debug interface according to claim 1, comprising a plurality of ports.

3. A debug interface according to claim 2, wherein said plurality of ports corresponds to said plurality of applications.

4. A debug interface according to claim 1, wherein said at least one port comprises an http port.

5. A debug interface according to claim 1, wherein said virtual machine comprises a java virtual machine and said diagnostic signal processing logic is configured to receive diagnostic signals in a JDWP format and to amend said diagnostic signals to a KDWP format.

6. A debug interface according to claim 1, said debug interface further comprising communication logic, said communication logic, prior to said debug interface receiving diagnostic signals from said debugger host, is configured to request and receive information from said virtual machine indicative of said plurality of applications being processed by said virtual machine, said debug interface configured to generate said at least one port corresponding to at least one of said plurality of applications.

7. A debug interface according to claim 6, wherein said debug interface is configured to generate a plurality of ports corresponding to said plurality of applications.

8. A debug interface according to claim 6, wherein said debug interface is configured to store data identifying said application corresponding to said at least one port, and is configured to provide said identifying data to said debugger host in response to a request for said information.

9. A debug interface according to claim 1, further including communication logic circuitry configured to receive diagnostic data from said virtual machine generated by diagnostic operations performed on an application in response to said amended diagnostic signals and to output said diagnostic data from said port corresponding to said application said diagnostic operation was performed on.

10. A system comprising a debug interface according to claim 1, in data communication with a virtual machine.

11. A data processing apparatus comprising a virtual machine configured to process a plurality of applications in parallel and operable to receive a debug diagnostic signal, said debug diagnostic signal identifying one of said plurality of applications, said virtual machine, in response to said received debug diagnostic signal, configured to perform a diagnostic operation on said identified application, wherein said debug diagnostic signal is in a KDWP format.

12. A data processing apparatus according to claim 11, wherein said virtual machine is a Java virtual machine.

13. A data processing apparatus according to claim 11, wherein said virtual machine is located on at least one of a mobile telephone and a set top box.

14. A data processing apparatus according to claim 11, said virtual machine configured to send data identifying applications being processed by said virtual machine in response to receiving a request for said data from a debug interface.

15. A method of amending diagnostic signals received from a host debugger to make them suitable for performing diagnostic operations on an application running on a virtual machine processing a plurality of applications in parallel, said method comprising the steps of:
    receiving at least one port a diagnostic signal from said host debugger, said diagnostic signal specifying a diagnostic operation to be performed on an application running on said virtual machine;
    determining which of said plurality of applications said received diagnostic signal pertains to in dependence upon said at least one port said diagnostic signal was received at; and
    amending said received diagnostic signal to identify said application prior to sending said amended diagnostic signal to said virtual machine, said virtual machine is configured to perform said diagnostic operation on said identified application in response to said received diagnostic signal.

16. A method according to claim 15, comprising a further step performed prior to said steps of receiving, determining and amending, said further step comprising requesting and receiving information from said virtual machine indicative of said plurality of applications being processed by said virtual machine and generating said at least one port corresponding to at least one of said plurality of applications.

17. A method according to claim 16, wherein said step of generating said at least one port comprises generating a plurality of ports corresponding to said plurality of applications.

18. A method according to claim 16, comprising a further step following said step of generating said at least one port, of providing data identifying said application corresponding to said at least one port to said debugger host in response to a request for said information.

19. A method according to claim 16, comprising the further steps of receiving diagnostic data from said virtual machine generated by diagnostic operations performed on an application in response to said amended diagnostic signals and outputting said diagnostic data from said port corresponding to said application said diagnostic operations were performed on.

20. A computer program product comprising a computer readable storage medium containing computer readable instructions that when run on a data processor controls the data processor to perform the steps of the method according to claim 15.

* * * * *